United States Patent
Warke (10) Patent No.: US 6,566,889 B2
(45) Date of Patent: May 20, 2003

(54) LINE DIAGNOSTICS FOR WIRELINE MODEMS

(75) Inventor: Nirmal Warke, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/947,009

(22) Filed: Sep. 4, 2001

(65) Prior Publication Data

US 2003/0001586 A1 Jan. 2, 2003

Related U.S. Application Data

(60) Provisional application No. 60/284,659, filed on Apr. 17, 2001.

(51) Int. Cl.[7] .............. G01R 31/08; G01R 31/11; H01H 9/50
(52) U.S. Cl. .............. 324/527; 324/520; 324/521; 324/532; 324/533; 324/534; 324/537; 702/59
(58) Field of Search .............. 324/527, 520, 324/534, 533, 532, 537, 543, 535, 521, 642; 709/59; 379/22.03, 22.02, 9, 15.02, 6, 1.04, 27.01

(56) References Cited

U.S. PATENT DOCUMENTS

| | | | | |
|---|---|---|---|---|
| 3,728,620 A | * | 4/1973 | Heins | 324/520 |
| 3,751,606 A | * | 8/1973 | Kaiser, Jr. | 379/22.03 |
| 3,904,839 A | * | 9/1975 | Peoples | 379/22.03 |
| 4,739,276 A | | 4/1988 | Graube | 324/534 |
| 4,766,386 A | | 8/1988 | Oliver et al. | 324/533 |
| 4,766,549 A | * | 8/1988 | Schweitzer, III et al. | 702/59 |
| 5,128,619 A | | 7/1992 | Bjork et al. | 324/533 |
| 5,864,602 A | * | 1/1999 | Needle | 379/22.02 |
| 6,177,801 B1 | | 1/2001 | Chong | 324/520 |
| 6,209,108 B1 | * | 3/2001 | Pett et al. | 714/43 |
| 6,292,539 B1 | * | 9/2001 | Eichen et al. | 379/1.04 |
| 6,389,109 B1 | * | 5/2002 | Schmidt et al. | 379/1.04 |

OTHER PUBLICATIONS

Dr. DSL Diagnostics Whitepaper "Enabling DSL Chipsets with Advanced Loop Diagnostics for Qualification, Troubleshooting and Management"; Aware, Inc.; 2001 pp. 1–8.

* cited by examiner

Primary Examiner—Christine Oda
Assistant Examiner—Wasseem H. Hamdan
(74) Attorney, Agent, or Firm—J. Dennis Moore; W. James Brady; Frederick J. Telecky, Jr.

(57) ABSTRACT

A modem with built-in transmission line diagnostic capability is presented. Said built-in line diagnostics are capable of determining said transmission line's length and detecting the presence of any bridge taps. Said built-in diagnostics have an advantage of not requiring any specialized or expensive hardware and can be added to an existing modem without significant redesign work.

29 Claims, 2 Drawing Sheets

LINE DIAGNOSTICS FOR WIRELINE MODEMS

This application claims priority to the provisional application Ser. No. 60/284,659 entitled "Line Diagnostics for Wireline Modems", filed Apr. 17, 2001, which provisional application is incorporated herein by reference.

FIELD OF THE INVENTION

This invention relates generally to data communications over transmission lines, and particularly to determining transmission line characteristics using transmission line devices attached to the transmission line.

BACKGROUND OF THE INVENTION

Digital transmission techniques are becoming the preferred transmission method of choice for high-speed data/voice/multimedia communications for both business and consumer applications. Digital transmission techniques have been used to obtain 56 kilobits per second (kbps) over plain old telephone service (POTS) lines and a different digital transmission technique is providing data rates exceeding a megabit per second (Mbps) over the same POTS lines.

However, not every arbitrary transmission line will be able to support these high data rates and restrictions on transmission line quality and length are required. For example, in Asymmetric Digital Subscriber Line (ADSL) applications, individual transmission lines (twisted-pair in the case of ADSL) generally cannot be greater than 19,000 feet (19 kft) in length and if bridge taps are present on the transmission line this maximum transmission line length reduces further. A bridge tap is a commonly used way for attaching additional circuits to an existing transmission line. In a home application, bridge taps are used to provide multiple telephone extension lines from a single telephone line coming into the home. The presence of a bridge tap can significantly alter the spectral characteristics of the transmission line. While ADSL installations have been successful with transmission lines with lengths at or near 19 kft and in some cases with bridge taps, the performance is typically quite low and sable operation cannot be assured. Even simple adherence to the transmission line restrictions is not sufficient to ensure a successful installation. This may be due to interference from external sources, such as far-end and near-end crosstalk, AM radio, and in-home appliances with electrical motors.

A typical installation scenario involves an end-user, desiring a high-speed connection to the Internet, placing a telephone call to a local service provider and requesting service. From the end-user's telephone number and perhaps his address, the local service provider can determine if a high-speed connection is potentially available to the end-user. If the end-user resides in a boundary area (an area where transmission line lengths are approximately equal to the maximum allowed line length) where a definitive YES or NO answer cannot be given, the service provider may perform a simple diagnostic probe of the end-user's transmission line (for ADSL, the end-user's telephone line) to determine the end-user's loop characteristics. Even if the diagnostic probe has determined that a high-speed connection is possible, i.e., the line length is within allowable limits, it does not necessarily mean that a high-speed connection can be established. A system using a transmission line that is at the upper limit of the maximum allowed length is extraordinarily sensitive to external interference and the service provider would not be able to determine functionality until a modem is actually in place at the end-user's home and a connection attempted. Even an end-user who is using a short transmission line may not be ensured a certain quality of service if his transmission line is of particularly poor quality.

Many techniques have been presented in the past for determining the length and spectral characteristics of a transmission line. One commonly used technique is time domain reflectometry (TDR). In TDR, a test pulse or a test waveform is transmitted down the transmission line and any reflections from an impedance discontinuity or defect in the transmission line along with the time it takes for the pulse to reach the discontinuity and return is recorded. The location of the discontinuity is calculated from the elapsed time and the type and magnitude of the discontinuity is determined from the distortion of the test pulse. TDR is a highly sensitive technique that can reveal not only major defects, such as open or short circuits, but also minute variations, such as impedance variations, frayed shields and bridge taps. TDR however, requires special and usually expensive test equipment and trained operators to properly perform the tests and interpret the results. Additionally, integrating TDR into existing communications devices is very difficult and typically involves a complete device redesign. Hence, time domain reflectometry is usually only performed from the service provider's end of the connection and not at the end-user's end. TDR is therefore not a method that the typical end-user can use to self-diagnose problems on his or her high data-rate connection. A need has therefore arisen for a way to diagnose a transmission line without requiring specialized equipment and training.

SUMMARY OF THE INVENTION

In one aspect, the present invention provides an apparatus for performing diagnostics on a transmission line, said apparatus comprising a test signal generator coupled to the transmission line for injecting test signals onto the transmission line, a signal calculating circuit with an input coupled to the transmission line for measuring and calculating spectral characteristics of the transmission line, an equivalent line length calculator coupled to the signal measuring circuit for calculating the equivalent line length of the transmission line using the spectral characteristics of the transmission line, a cost function calculator coupled to the signal measuring circuit for calculating a cost function using the spectral characteristics of the transmission line, and a bridge tap detector, coupled to the cost function calculator for determining the presence of a bridge tap by comparing the output of the cost function calculator with a threshold.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

A modem allows a remote user through the use of a computer or a computer network to connect to another computer or computer network via a connection that is normally not part of a computer network, such as a telephone line, a video cable, or a power line. A voice-band modem uses standard telephone lines as a low-speed data transmission line and an ADSL modem also uses the telephone lines as a high-speed data transmission line. The modems permit users to connect to a remote network over a transmission line (the telephone line) that does not usually function as a network connection (a telephone line normally carries voice). As more complex transmission methods are used, a set of technical specifications defining the physical, electrical, and spectral characteristics of the transmission lines used in transmitting the more complex transmission methods becomes more stringent. For example, in the case of ADSL, the telephone line cannot be longer than 19,000 feet (19 kft) in length when measured from the modem to a central office and the presence of any bridge taps can severely reduce the maximum transmission line length or it may even prevent the establishment of a connection. ADSL is a digital data connection and transmission technology and is used in these specifications to facilitate discussion of the present invention. ADSL is not the only technology with which this present invention is applicable and the use of ADSL in the discussion should not be construed to limit this invention's application to ADSL.

Figure 1:
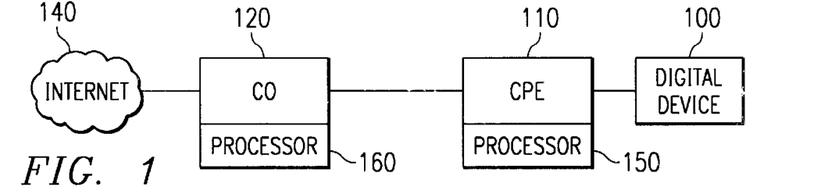
FIG. 1 illustrates a data connection between an end-user and a service provider via a transmission line.

Refer now to FIG. 1 for a diagram illustrating a typical remote end-user connection to a service provider via a transmission line. A digital device 100 is connected to a customer premise equipment (CPE) 110 which is connected to a central office (CO) 120 via a transmission line 130. The digital device 100 may be a personal computer (PC), an Internet appliance, a personal digital assistant (PDA), or any device capable of receiving digital data. The OPE 110 can be a voice-band modem, an ADSL modem, a cable modem, or any other type of device that is capable of modulating (demodulating) a data signal and transmits (receives) that modulated signal over the transmission line 130 to (from) another device connected at the other end of the transmission line 130, and can have a processor 150, such as a digital signal processor, as a component part. The CO 120 has a compatible device connected at its end to receive (transmit) the modulated signal from (to) the OPE 110. The CO 120 may contain on its premises a computer or a network of computers that communicates with the CPE 110 or it may simply be a connection into a larger network 140, such as a private corporate network or the Internet, and can have a processor 160, such as a digital signal processor, as a component part.

Figures 2, 3A, 3B:
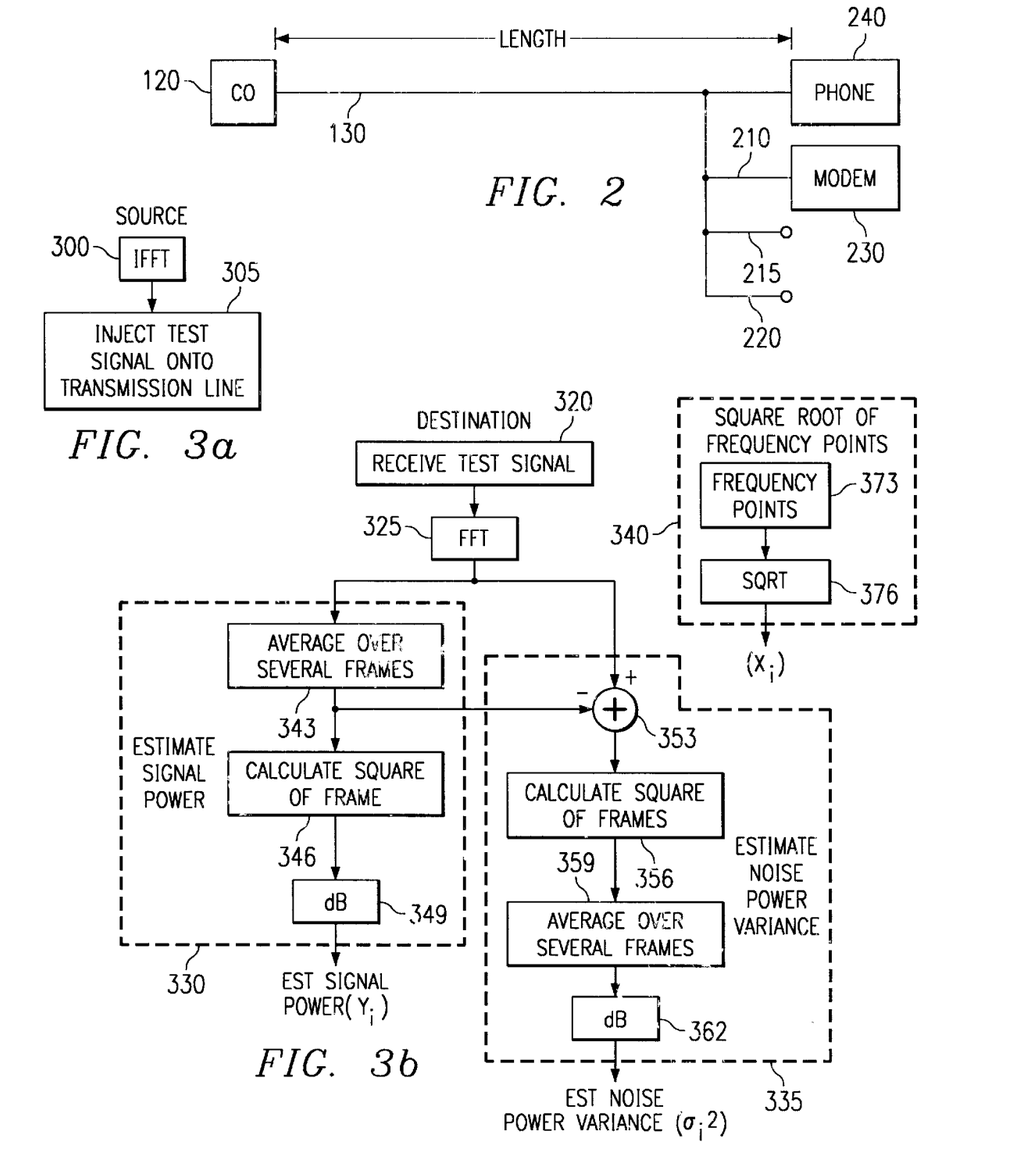
FIG. 2 is a diagram illustrating a typical transmission line with bridge taps.
FIG. 3a is a flow diagram displaying a source diagnostic device's operation.
FIG. 3b is a flow diagram displaying a destination diagnostic device's operation.

As previously stated, the higher the speed of the data connection, the greater the restrictions placed on the transmission line 130. Referring now to FIG. 2 for a diagram illustrating a typical transmission line 130 with bridge taps. Two common restrictions placed on transmission lines are the overall length of the transmission line and the prohibition of bridge taps. For ADSL, the overall length is simply the length of the transmission line between the CO 120 and the CPE 110. The transmission line 130 displayed in FIG. 2 is a plain old telephone system (POTS) line with several extension lines (210, 215, 220, etc.) hanging from the main transmission line 130. Each one of the extension lines is connected to the main transmission line 130 with a bridge tap. Bridge taps are not limited to extension lines and may appear in the middle of a transmission line to provide a second transmission line for another application. However, the bridge taps that are closest to the ends of a transmission line have the most effect on the performance of the transmission line 130. Connected to the bridge tap 210 is a CPE, in this case, a modem 230. Connected to another bridge tap is a telephone 240.

Since the present invention has application with both analog (voice band) and digital modems, the modem 230 displayed in FIG. 2 may be either an analog or a digital modem. Should the modem 230 be an analog modem, an inline filter (not shown) is needed prior to the modem 230 to prevent high frequency signals such as signals from ADSL systems from entering the modem 230.

The problem with bridge taps being present on the transmission line 130 is that they can dramatically alter the spectral characteristics of the transmission line 130, and the more bridge taps present in general the greater the impact on the transmission line's spectral characteristics. The impact of bridge taps on modem performance is so unpredictable, with their impact varying significantly depending on the bridge tap's length and the total number of bridge taps. Normally, if possible one would try to avoid the presence of bridge taps when installing ADSL.

Historically, performing line diagnostics on transmission lines have required specialized equipment and trained operators. Line diagnostics using techniques such as time domain reflectometry (TDR) are beyond the abilities of the common end-user. This results in the end-user being at the mercy of the service provider when it comes to performing diagnostics on a troublesome transmission line. Refer now to FIGS. 3a and 3b for flow diagrams illustrating the operation of a preferred embodiment of the present invention using a periodic test signal. Non-periodic test signals may be also be used, but the use of periodic test signals reduces the overall amount of processing required. A preferred embodiment of the present invention is a dual-ended line diagnostic, meaning that diagnostic devices are present at both ends of the transmission medium, having a source diagnostic device and a destination diagnostic device. The discussion of a preferred embodiment will assume that a first diagnostic device at the CO 120 is the source diagnostic device and a second diagnostic device at the CPE 110 is the destination diagnostic device, however, the process is similar if the CPE 110 was the source diagnostic device.

In the preferred embodiment of the present invention, the diagnostic devices are implemented in software that executes on the modem's digital signal processor, such as processors 150 and 160 (FIG. 1). The incremental computational complexity in implementing the present invention on the ADSL modem is minimal due to the fact that the required signal and noise information required by the invention would already be estimated by the modem for determining the channel SNR and the corresponding connect rate it can support. The software may be implemented on various types of processors, from a dedicated application specific IC (ASIC) to a general purpose DSP to a general-purpose microprocessor. However, the preferred embodiment of the present invention may also be implemented in dedicated hardware with its associated firmware.

In the preferred embodiment of the present invention, a source diagnostic device is contained wholly within the CO 120, typically a modem. The source diagnostic device initiates the diagnostics by sending a test signal (block 305) to the CPE 110 via the transmission line 130. In an ADSL system, the test signal must be converted into a transmitted test signal via an inverse Fast Fourier Transform 300 prior to being injected into the transmission line 130. The inverse Fast Fourier Transform 300 converts the test signal that is in the frequency domain into a time domain signal, making it suitable for transmission.

The test signal transmitted on the transmission line may be a single pulse, a sequence of pulses, or a more complex test signal. In an ADSL system, the preferred test signal is the REVERB signal, which is defined in the ADSL standard (as specified in "Asymmetrical digital subscriber line (ADSL) transceivers," ITU-T G.992.1, July 1999) as a periodic, wide-bandwidth, spectrally flat signal with pseudo-random noise characteristics. Another preferred test signal for an ADSL system is the MEDLEY signal, which is defined in the ADSL standard as a wide-bandwidth, spectrally flat pseudo-random signal that has a period spanning several data frames. Any other particular implementation of a pseudo-random signal can be used. The use of a signal such as the REVERB signal has several advantages, including: a wide signal bandwidth that covers the entire frequency band of interest; a pseudo-random noise behavior that enables the accurate estimation of signal and noise power; and periodicity that permits averaging over several periods to eliminate the effects of inter-symbol-interference (ISI) between transmitted data frames.

Referring now to FIG. 3b, where at the CPE 110, a destination diagnostic device receives the transmitted signal (block 320) and calculates the characteristics of the transmission line, including an estimate of the signal power (block 330), an estimate of the noise power variance (block 335), and the square root of the frequency points (block 340). In the preferred embodiment of the present invention, the calculation of the square root of the frequency points 340 occurred prior to the initiation of the line diagnostics and is stored in memory, due to the a priori knowledge of the desired frequency points. The square root 376 of the frequency points 373 is denoted $x_i$. For example, in an ADSL system, there is a frequency point for each one of the 256 subcarriers capable of carrying data. For ADSL implementations, a Fast Fourier Transform 325 at the beginning of the receive signal path converts the received test signal back into the frequency domain.

The calculation of the estimated signal power 330 is performed by averaging the received test signal over several frames of data 343, producing an average received test signal, and then calculating the square of the average received test signal 346 for each frequency point. The estimated signal power is then converted into decibels (dB) by block 349. The estimated signal power in dB is denoted $y_i$. The calculation of the estimated noise power 335 is performed by first subtracting (block 353) the average received test signal (the output of block 343) from the received test signal. The subtraction in block 353 eliminates the test signal component from the received signal, which really is comprised of the received test signal (transformed by the transmission line) plus noise. After the subtraction in block 353, only the noise component remains. The frames of noise data are then squared 356 for each frequency point and then averaged together over several frames 359. The estimated noise power is then converted into dB by block 362. The estimated noise power in dB is denoted $\sigma_i^2$.

In the preferred embodiment of the present invention, the estimated signal power and estimated noise power is calculated at each frequency point.

Figure 4A:
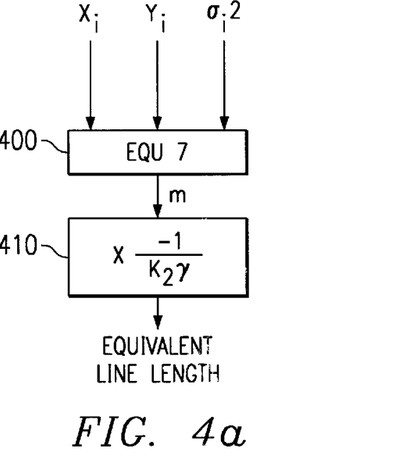
FIG. 4a is a block diagram illustrating steps in calculating an equivalent line length using information gathered during a transmission line diagnostic.

Referring now to FIG. 4a for a block diagram illustrating the calculation of an equivalent line length, l. Using the estimated signal power ($y_i$) and estimated noise power ($\sigma_i^2$) and the square root of frequency points ($x_i$), the destination diagnostic device calculates the equivalent line length. It uses a mathematical formula shown below (derivation of the formula will be discussed later):

$$ l = -\frac{1}{\gamma \cdot K_2} \cdot \frac{A \cdot \sum_i \frac{x_i y_i}{\sigma_i^2} - B \cdot \sum_i \frac{y_i}{\sigma_i^2}}{Den} $$

Where:

l—equivalent line length;
γ—proportionality constant, depending on gauge of wire;
$K_2$—proportionality constant, depending on wire;

$$ A = \sum_i \frac{1}{\sigma_i^2}; $$

$$ B = \sum_i \frac{x_i}{\sigma_i^2}; \text{ and} $$

$$ Den = \sum_i \frac{x_i^2}{\sigma_i^2} \cdot \sum_i \frac{1}{\sigma_i^2} - \left(\sum_i \frac{x_i}{\sigma_i^2}\right)^2 $$

The mathematical formula provides an estimate of the length of the transmission line. The proportionality constant, γ, is dependent on the type of the transmission line and for an ADSL system using 26 gauge twisted-pair, a typical value for γ is $7.36 \times 10^{-10}$, while $K_2$ is 20 log 10(e)=8.6859. In another preferred embodiment of the present invention, the value of γ can be stored in a look-up table with indexing based on transmission line type. The storage of γ for different types of transmission lines provides a way to easily support line diagnostics for a wide variety of transmission line types.

While shown above as a single equation, in the preferred embodiment of the present invention, the calculation of the equivalent line length is calculated in two steps. The partitioning of the calculation into two steps is to generate an intermediate value that is used in a later calculation. In a first step (block 400), the destination diagnostic device evaluates the equation:

$$ m = \frac{A \cdot \sum_i \frac{x_i y_i}{\sigma_i^2} - B \cdot \sum_i \frac{y_i}{\sigma_i^2}}{Den} \qquad (i) $$

Where $A = \sum_i \frac{1}{\sigma_i^2}, B = \sum_i \frac{x_i}{\sigma_i^2}$ and, $$ Den = \sum_i \frac{x_i^2}{\sigma_i^2} \cdot \sum_i \frac{1}{\sigma_i^2} - \left(\sum_i \frac{x_i}{\sigma_i^2}\right)^2. $$

Followed by a second step (block 410), where the destination diagnostic device multiplies the result of the above expression (the output of block 400) with $$-\frac{1}{\gamma \cdot K_2}.$$

The net result is l, the equivalent line length of the transmission line.

Figure 4B:
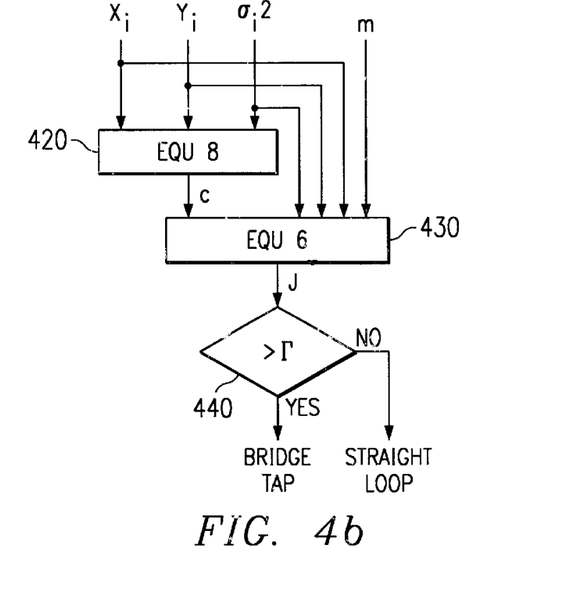
FIG. 4b is a block diagram illustrating steps in determining the presence of a bridge tap using information gathered during a transmission line diagnostic.

Referring now to FIG. 4b for a block diagram displaying the determination of whether or not the transmission line has a bridge tap(s) connected to it. This operation is broken up into two stages, an evaluation of a cost function and a comparison of the value of the cost function with a threshold. The evaluation of the cost function involves fitting a curve (in this case, a straight line expressed as y=mx+c) through the estimated signal power data points. After fitting the curve (straight line in this case) through the points, the destination diagnostic device calculates the difference between the actual estimated signal power data points and the curve (straight line in this case). The difference between the estimated signal power data points and the curve (straight line in this case) fitted through the data points weighted inversely by the noise power is used in the evaluation of the cost function. The cost function is used to determine a number that describes the quality of the fit between the estimated signal power data points and the curve (straight line in this case) fitted through the estimated signal power data points. The destination diagnostic device uses a mathematical formula to calculate the cost function (for a straight line fit):

$$J(m, c) = \sum_{i=1}^{N} \frac{(y_i - m \cdot x_i - c)^2}{\sigma_i^2}$$

Where:
- $y_i$—estimated signal power;
- $\sigma_i^2$—estimated noise power
- $x_i$—square root of frequency;
- m—slope of fitted straight line, y=mx+c; and
- c—the y intercept of fitted straight line, y=mx+c.

The cost function used in the preferred embodiment of the present invention, J(m, c), is a least squares minimization for a straight line fit. However, any other cost function can be used. The value of the cost function provides an idea of how tightly the estimated signal power data points fit to the straight line fitted through them. The smaller the value of the cost function, the better the fit. For example, if all of the estimated signal power data points lay on the fitted straight line, then the value of the cost function would be zero because there would be no difference between the estimated signal power data points and the straight line.

In the expression for the cost function, J(m, c), the numerator $(y_i-m.x_i-c)^2$ is divided by a denominator $\sigma_i^2$, the estimated noise power at frequency point $x_i$. The estimated noise power, $\sigma_i^2$, is small when the noise power at frequency point $x_i$ is small and large when the noise power at frequency point $x_i$ is large. By dividing by $\sigma_i^2$, the numerator is, in effect, weighed by the estimated noise power. If the estimated noise power at the frequency point is small, then the confidence in the estimated signal power at that frequency point is expected to be good and therefore the value of the cost function at that particular frequency should be weighed heavily. If the estimated noise power at the frequency point is large, then the confidence in the estimated signal power at that frequency is expected to be poor and therefore the value of the cost function at that particular frequency should be weighed lightly.

Once again, the evaluation of the cost function is performed in multiple stages. In a first stage 420, the value c is calculated using the equation:

$$c = \frac{\sum_i \frac{(y_i - m \cdot x_i)}{\sigma_i^2}}{\sum_i \frac{1}{\sigma_i^2}}. \tag{ii}$$

In a second stage 430, the actual cost function, J(m, c), is evaluated using the equation:

$$J(m, c) = \sum_{i=1}^{N} \frac{(y_i - m \cdot x_i - c)^2}{\sigma_i^2}. \tag{iii}$$

The value of the cost function is then used to determine if a bridge tap(s) is present on the transmission line. The destination diagnostic device simply compares the value of the cost function with a threshold, $\Gamma$ (block 440). If the cost function exceeds $\Gamma$, then the transmission line has at least one bridge tap on it. Mathematically, this is expressible as:

$$J(m, c) = \sum_{i=1}^{N} \frac{(y_i - m \cdot x_i - c)^2}{\sigma_i^2} > \Gamma.$$

The value of $\Gamma$ is set by the user based on the signal power, noise power, and value of N. Choosing a high value for $\Gamma$ would imply that the probability of misclassifying a bridge tap loop as a straight loop would be higher than the probability of misclassifying a straight loop as a bridge tap loop and vice versa. Typically, the value of $\Gamma$ would be 1% of the average SNR over all the frequencies, e.g., $$\frac{1}{N} \cdot \sum_{i=1}^{N} \frac{(y_i)^2}{\sigma_i^2} = \frac{1}{N} \cdot \sum_{i=1}^{N} SNR_i.$$

This essentially allows the straight line fit for the signal power to be off by 1% from the estimated signal power. In the final determination of the presence of bridge taps, if the value of the cost function is small (J(m, c)<<$\Gamma$), then there is good confidence that there are no bridge taps on the transmission line. If the value of the cost function is large (J(m, c)>>$\Gamma$), then there is good confidence that there are bridge taps on the transmission line. If the value of the cost function is close to the value of $\Gamma$, then the presence of a bridge tap is difficult to determine with a high degree of certainty.

Figure 5:
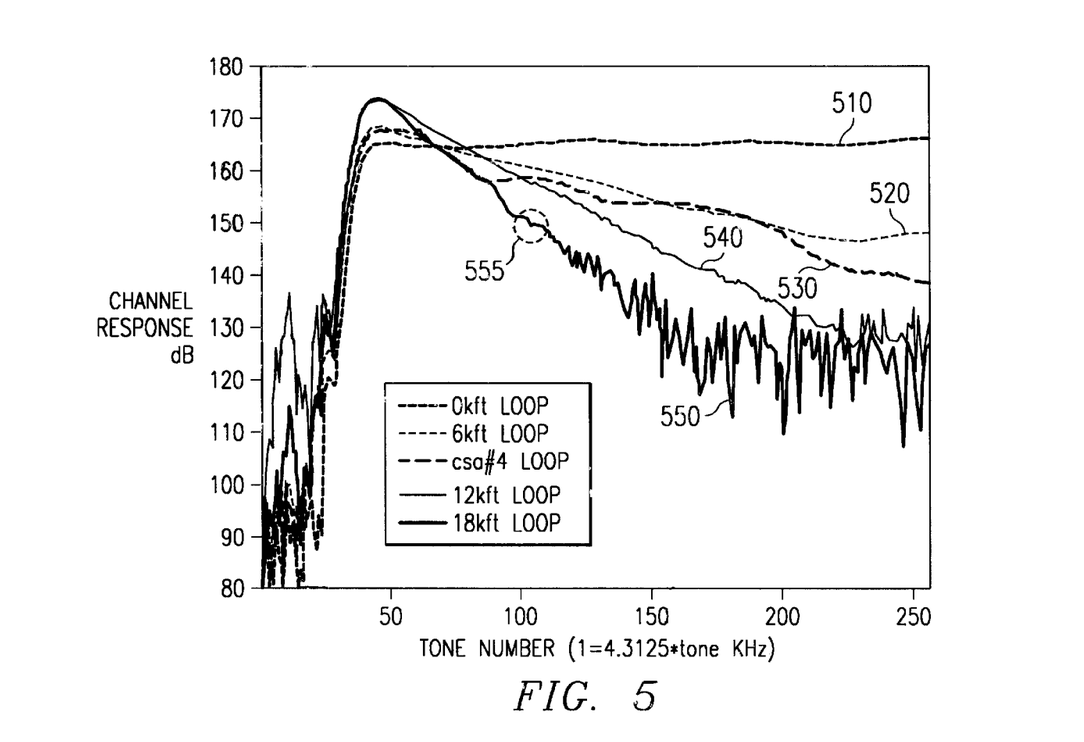
FIG. 5 is a data plot illustrating actual channel responses for transmission lines of varying length and with bridge taps.

Referring now to FIG. 5 for a data plot displaying measured transmission line channel responses as a function of frequency for bridge tap free transmission lines of various lengths. The transmission lines shown in the data plot range in length from 0 kft to 18 kft. A special ADSL test transmission line with bridge taps, labeled CSA #4, was also measured. The measured channel responses were then used to evaluate the performance of the line diagnostic device. A transmission line of length 0 kft 510 displays a flat channel response across the entire frequency range, while transmission lines of length 6 kft 520, 12 kft 540, and 18 kft 550 display an increasingly noisy channel response and a rapid roll-off with increased frequency. In the case of the 18 kft transmission line 550, the channel response becomes extremely erratic in the upper-half of the frequency range. The channel response for the CSA#4 ADSL test transmission line 530 was relatively flat and well behaved, lying between the channel responses for the 6 kft and the 12 kft long transmission lines. However, the channel response of the ADSL test transmission line 530 displayed large undulations that are characteristic of transmission lines with bridge taps and the large undulations would result in the cost function, J(m, c), evaluating to a large value because the undulations do not fit very well to a straight line equation.

The channel response of the 18 kft transmission line 550 displays an extremely erratic behavior in the upper-half of the frequency range. Such an erratic behavior automatically precludes the use of the data in the equation for equivalent line length and the cost function due to the extraordinarily large noise component. In the preferred embodiment of the present invention, when the data points display such erratic behavior, the data points are manually discarded. The preferred embodiment of the present invention can adaptively adjust the frequency range of interest should the behavior of the data become erratic. For example, in the case of the 18 kft transmission line 550, all data points beyond the $100^{th}$ tone number were discarded. The data points discarded were all data points to the right of the circle 555. In another preferred embodiment of the present invention, the test signal would be transmitted for an extended amount of time and the received test signal would be averaged over a large number of frames. Performing the transmission line diagnostics for a longer time period would reduce the effect of the noise for long transmission lines.

Prior to use, the spectral characteristics of a transmission line are not known to the modem. This may be due to the fact that the end-user has moved the modem to a different location, a new source of distortion is present or an old source of distortion has been eliminated, or the end-user is connecting to a different destination (potentially resulting in a different circuit being used). Therefore, in the initial stages of a modem connection attempt, the modem must train itself. To perform the training, the modem transmits a training sequence into the transmission line. The training sequence is a series of tones, signals, and data, usually specified in the technical standards for the particular transmission method used, that is transmitted over the transmission lines. The modem at the other end receives the training sequence and analyzes the results and sends information back to the initializing modem. This exchange of information allows the initializing modems to gather information about the transmission line and use the gathered information to configure various components within the modem. The training is required to optimize the modems for maximum performance on the particular transmission line.

In the preferred embodiment of the present invention, the line diagnostic device takes advantage of the training period and performs a diagnostic on the transmission line during the training period. Preferably, the diagnostic is performed during the early stages of the training period. By performing the diagnostic early in the training period, the diagnostic is ensured of completing even if the modem is not able to establish a connection. The ensured completion of the diagnostic provides valuable information that can be used by the end-user and/or the service provider to diagnose any connection or performance problems that the end-user is experiencing.

In another preferred embodiment of the present invention, after the destination diagnostic device receives the test signal, it does not immediately calculate the estimated signal power, the estimated noise power, and the equivalent line length and determine the presence of bridge taps. Instead, the destination diagnostic device saves the information to a memory and performs the calculation when the modem (hence the modem's digital signal processor) is not busy performing some other task. In effect, the destination diagnostic device is using the modem's digital signal processor when it has some idle time to perform the calculations.

In all modem implementations, during the training period, the modem must calculate the transmission line's signal-to-noise ratio (SNR). The SNR is used to assist in optimizing the connection between the two modems. In order to perform the calculation, the modem must calculate the signal power and the noise power. In yet another preferred embodiment of the present invention, the destination diagnostic device makes use of the signal power and noise power calculations already performed by the modem in the calculation of the equivalent line length and determining the presence of bridge taps. By using values provided by the modem, the source diagnostic device does not have to inject the test signal into the transmission line and the destination diagnostic device saves on computation time. In fact, by using the values provided by the modem, the CO 120 (the source in this example) does not require a diagnostic device, since the test signal does not have to be injected into the transmission line.

Derivation of Mathematical Formulae

The following is a derivation of the mathematical formulae discussed above. The derivation is taken from the provision application "Line Diagnostics for Wireline Modems", filed Apr. 17, 2001, which is incorporated herein by reference.

The first task is to create an equation of a transfer function for the transmission line as a function of frequency (f, Hz) and length (l, ft). A good approximation for the transfer function for twisted-pair copper wire (twisted-pair is the transmission line used in an ADSL application) is:

$$H_{loop} = K_l(l) * e^{-l \cdot \gamma \cdot \sqrt{f}} \tag{1}$$

Where $\gamma \approx 7.36e-10$ for 26 gauge (AWG) lines. If the transmitting and receiving modem's analog front ends have non-flat transfer functions, then the non-flat transfer functions must also be modeled into an equivalent transfer function, H(f), or compensation must be provided in the received signal power.

The received signal power, $S_i$, is calculated as $S_i = |H(f)|^2 * |X(f)|^2$, where X(f) is the transmitted test signal which is generally spectrally flat. If the transmitted signal is not spectrally flat, then the spectral shape of the transmitted signal must also be taken into account in the equivalent transfer function or compensated for in the received signal power.

Using equation (1), the received signal power in decibels (dB) can be expressed as $$10 * \log_{10} S_i = K_l(l) - K_2 \cdot \gamma \cdot l \cdot \sqrt{f} \tag{2}$$

Which is expressible as a straight line equation of the form y=m.x+c where, $$y = 10 * \log_{10} S_i \tag{3}$$

$$x = \sqrt{f} \tag{4}$$

$$m = -K_2 \cdot \gamma \cdot l \tag{5}$$

and, $c = K_l(l)$

The presence of a bridge tap on the loop will result in a loop transfer function that does not follow equation (1).

Hence, the presence of a bridge tap can be detected by determining the "goodness of fit" of the received signal power data (equation (3)) as a function of the square root of frequency (equation (4)) to the straight-line equation y=m.x+c. Also, the equivalent loop length can be directly determined from an estimate of the slope of the line, m (equation (5)). In the next section, the details of the algorithm used to detect the presence of bridge taps and calculate the equivalent line length is outlined.

Algorithm Details

The problem is reformulated as a least-squares minimization. Any other cost function can be used, however, the least squares criterion is generally most analytically tractable. The estimated signal power is denoted as $y_i$, i=1, ..., N at the frequencies $f_i$, i=1, ..., N. From equation (4), $x_i = \sqrt{f_i}$, i=1, ..., N.

Using the cost function:

$$J(m, c) = \sum_{i=1}^{N} \frac{(y_i - m \cdot x_i - c)^2}{\sigma_i^2} \qquad (6)$$

Where $\sigma_i^2$ is the noise power (or noise variance) measured at frequency $f_i$. By weighting each term in the above expression by the inverse of the noise power, the terms estimated in a high noise environment are effectively de-emphasized.

Now, the values of m and c that minimizes the above expression or (m, c)=arg(min(J(m, c))) must be determined. To solve for the optimal slope, m, and intercept, c, the partial differentials of J(m, c) with respect to m and set equal to zero:

$$\frac{\partial J(m, c)}{\partial m} = -\sum_i \frac{2}{\sigma_i^2}(y_i - m \cdot x_i - c) \cdot x_i = 0$$

$$\frac{\partial J(m, c)}{\partial c} = -\sum_i \frac{2}{\sigma_i^2}(y_i - m \cdot x_i - c) = 0$$

Solving the above equations for m and c, the following is obtained:

$$m = \frac{\sum_i \frac{x_i y_i}{\sigma_i^2} \cdot \sum_i \frac{1}{\sigma_i^2} - \sum_i \frac{x_i}{\sigma_i^2} \cdot \sum_i \frac{y_i}{\sigma_i^2}}{\sum_i \frac{x_i^2}{\sigma_i^2} \cdot \sum_i \frac{1}{\sigma_i^2} - \left(\sum_i \frac{x_i}{\sigma_i^2}\right)^2} \qquad (7)$$

and, $$c = \frac{\sum_i \frac{(y_i - m \cdot x_i)}{\sigma_i^2}}{\sum_i \frac{1}{\sigma_i^2}} \qquad (8)$$

Rewriting the above expression for the slope, m, the following is obtained:

$$m = \frac{A \cdot \sum_i \frac{x_i y_i}{\sigma_i^2} - B \cdot \sum_i \frac{y_i}{\sigma_i^2}}{Den} \qquad (9)$$

Where $A = \sum_i \frac{1}{\sigma_i^2}$, $B = \sum_i \frac{x_i}{\sigma_i^2}$ and, $$Den = \sum_i \frac{x_i^2}{\sigma_i^2} \cdot \sum_i \frac{1}{\sigma_i^2} - \left(\sum_i \frac{x_i}{\sigma_i^2}\right)^2.$$

Hence from equations (5), (8) and (9), the equivalent loop length is expressible as:

$$l = \frac{1}{\gamma \cdot K_2} \cdot \frac{A \cdot \sum_i \frac{x_i y_i}{\sigma_i^2} - B \cdot \sum_i \frac{y_i}{\sigma_i^2}}{Den} \qquad (10)$$

and a bridge tap is present on the transmission line if:

$$J(m, c) = \sum_{i=1}^{N} \frac{(y_i - m \cdot x_i - c)^2}{\sigma_i^2} > \Gamma \qquad (11)$$

Where $\Gamma$ is the detection threshold. The value of the detection threshold determines the extent to which straight lines will be mis-detected as bridge tap loops in a high noise environment and vice-versa.

Implementation Details

In order to simplify the implementation of the above equations, an assumption concerning the estimated noise powers is made: The estimated noise power is assumed to be constant across the frequency band of interest, i.e., $\sigma_i^2$=const.=$\sigma^2 \forall i$.

Equation (10') for estimating the equivalent line length simplifies into:

$$l = \frac{1}{K} \cdot \sum_i y_i(n \cdot x_i - Sum_x) \qquad (12)$$

where K is a constant dependent on the type of wire and the frequencies at which the signal power is estimated and Sum $$Sum_x = \sum_i x_i$$

Note that the quantities K, n.$x_i$ and, $Sum_x$ can be pre-calculated and stored for use during run time. As mentioned earlier, if there are components either in the transmitting or receiving modem that cause the frequency response over the band of interest $f_i$, i=1, ..., N to be non-flat, then the received signal power must be compensated by this frequency response before use in the above equations.

Further, the criterion for detecting the presence of a bridge tap (equation (11)) can be simplified to:

$$D \cdot \sigma^2 \cdot J(m, c) =$$
$$\frac{D}{N} \cdot \left[\sum_i y_i\left(n \cdot y_i - \sum_i y_i\right)\right] - \frac{1}{N} \cdot \left[\sum_i y_i(n \cdot x_i - Sum_x)\right]^2 > D \cdot \sigma^2 \cdot \Gamma$$

$$\text{where } D = N \cdot \sum_i x_i^2 - \left(\sum_i x_i\right)^2.$$

Note that the second term in the above equation is exactly the term required for the line length estimate. Further, by choosing N, i.e., the number of frequency points, to be a power of 2 there are no real number divisions required to implement the above expression.

As will be apparent from the above description, the preferred embodiments provide several advantageous features including the ability to determine the transmission line's length and detect the presence of any bridge taps without requiring any specialized and expensive hardware. Another advantage of the present invention is that there is no major redesign work needed to implement the present invention in an existing modem.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for performing transmission line diagnostics, comprising the steps of:

injecting a test signal into a first end of the transmission line;

measuring a received signal at a second end of the transmission line;

estimating metrics for the transmission line based on the test and received signals;

calculating an equivalent length for the transmission line;

calculating a cost function value for the transmission line; and determining the presence of a bridge tap on the transmission line based on the value of the cost function.

2. A method according to claim 1, further comprising the steps of:

deriving a transfer function for the transmission line; and fitting a curve corresponding to the transfer function to the test and received signals.

3. A method according to claim 2, wherein the transfer function is a function of the transmission line's length and a frequency band of interest.

4. A method according to claim 2, wherein the fitted curve is a straight line of the form $y_i = m x_i + c$, wherein the $y_i$'s are the received signal power, the $x_i$'s are the square root of the frequencies within the frequency band of interest, and m and c are constants dependent upon the transmission line and the frequency band of interest.

5. A method according to claim 1, wherein the step of estimating the metrics comprises estimating received signal power and received noise power.

6. A method according to claim 1, wherein the step of calculating an equivalent line length uses the estimated metrics, the transfer function, and the curve.

7. A method according to claim 1, wherein the step of calculating a cost function value uses the estimated metrics, the transfer function, and the curve.

8. A method according to claim 1, wherein the step of calculating the equivalent line length for the transmission line is performed using equation:

$$l = -\frac{1}{\gamma \cdot K_2} \cdot \frac{A \cdot \sum_i \frac{x_i y_i}{\sigma_i^2} - B \cdot \sum_i \frac{y_i}{\sigma_i^2}}{Den} \text{ where}$$

$$A = \sum_i \frac{1}{\sigma_i^2}, B = \sum_i \frac{x_i}{\sigma_i^2},$$

$$Den = \sum_i \frac{x_i^2}{\sigma_i^2} \cdot \sum_i \frac{1}{\sigma_i^2} - \left(\sum_i \frac{x_i}{\sigma_i^2}\right)^2,$$

$y_i$ is estimated signal power (in dB), $x_i$ is the square root of the frequency, $\gamma$ and $K_2$ are constants depending on the wire type, $\sigma_i^2$ is estimated noise power, and i refers to i-th frequency point considered for the curve fitting.

9. A method according to claim 1, wherein the step of calculating the equivalent line length for the transmission line is performed using equation:

$$l = \frac{1}{K} \cdot \sum_i y_i (n \cdot x_i - Sum_x)$$

where K is a constant depending on wire type and frequency range and $$Sum_x = \sum_i x_i.$$

10. A method according to claim 1, wherein the step of calculating the cost function value for the transmission line is performed using equation:

$$J(m, c) = \sum_{i=1}^{N} \frac{(y_i - m \cdot x_i - c)^2}{\sigma_i^2}$$

where $y_i$ is estimated signal power (in dB), $x_i$ is the square root of the frequency, $\sigma_i^2$ is estimated noise power, m is $$m = \frac{A \cdot \sum_i \frac{x_i y_i}{\sigma_i^2} - B \cdot \sum_i \frac{y_i}{\sigma_i^2}}{Den},$$

$$A = \sum_i \frac{1}{\sigma_i^2}, B = \sum_i \frac{x_i}{\sigma_i^2},$$

Den is $Den = \sum_i \frac{x_i^2}{\sigma_i^2} \cdot \sum_i \frac{1}{\sigma_i^2} - \left(\sum_i \frac{x_i}{\sigma_i^2}\right)^2$, and c is $$c = \frac{\sum_i \frac{(y_i - m \cdot x_i)}{\sigma_i^2}}{\sum_i \frac{1}{\sigma_i^2}}.$$

11. A method according to claim 1, wherein the step of calculating the cost function value for the transmission line is performed using equation:

$$D \cdot \sigma^2 \cdot J(m, c) = \frac{D}{N} \cdot \left[\sum_i y_i \left(N \cdot y_i - \sum_i y_i\right)\right] - \frac{1}{N} \cdot \left[\sum_i y_i (N \cdot x_i - Sum_x)\right]^2$$

where N is the total number of frequency points used for curve fitting, $y_i$ is estimated signal power (in dB), $x_i$ is the square root of the frequency, $$Sum_x = \sum_i x_i, D = N \cdot \sum_i x_i^2 - \left(\sum_i x_i\right)^2 \text{ and } \sigma_i^2$$

the estimated noise power is assumed to be constant for all i.

12. A method according to claim 11, wherein N is chosen to be a power of 2.

13. A method according to claim 1, wherein the presence of a bridge tap is determined if the value of the cost function is greater than a certain threshold.

14. A method according to claim 13, wherein the threshold value is a small percentage of the average SNR over all frequencies of interest.

15. A method according to claim 1, wherein the test signal is a periodic (from frame to frame) wide-bandwidth spectrally flat test signal.

16. An apparatus for performing transmission line diagnostics, comprising;
   a test signal generator, having an output coupled to a first input of the transmission line, adapted to injecting test signals onto the transmission line;
   a measuring circuit, having an input coupled to a second input of the transmission line and having an output coupled to an equivalent line length calculator and a cost function calculator, adapted to measuring metrics of the transmission line from received test signals;
   the equivalent line length calculator, having an input coupled to the measuring circuit, adapted to calculating an equivalent line length from the metrics;
   the cost function calculator, having an input coupled to the measuring circuit and an output coupled to a bridge tap detector, adapted to calculating a cost function from the metrics; and
   the bridge tap detector, having an input coupled to the cost function calculator, adapted to determining the presence of a bridge tap.

17. An apparatus according to claim 16, wherein the metrics are comprised of estimated signal power and estimated noise power.

18. An apparatus according to claim 16, wherein the equivalent length calculator uses equation:

$$l = -\frac{1}{\gamma \cdot K_2} \cdot \frac{A \cdot \sum_i \frac{x_i y_i}{\sigma_i^2} - B \cdot \sum_i \frac{y_i}{\sigma_i^2}}{Den}$$

where $$A = \sum_i \frac{1}{\sigma_i^2}; B = \sum_i \frac{x_i}{\sigma_i^2}; Den = \sum_i \frac{x_i^2}{\sigma_i^2} \cdot \sum_i \frac{1}{\sigma_i^2} - \left(\sum_i \frac{x_i}{\sigma_i^2}\right)^2;$$

$y_i$ is estimated signal power (in dB); $x_i$ is the square root of the frequency; $\gamma$ and $K_2$ are constants depending on the wire, $\sigma_i^2$ is estimated noise power, and index i refers to i-th frequency point considered for the curve fitting.

19. An apparatus according to claim 16, wherein the cost function calculator uses equation:

$$J(m, c) = \sum_{i=1}^{N} \frac{(y_i - m \cdot x_i - c)^2}{\sigma_i^2}$$

where $y_i$ is estimated signal power (in dB), $x_i$ is the square root of the frequency, $\sigma_i^2$ is estimated noise power, m is $$m = \frac{A \cdot \sum_i \frac{x_i y_i}{\sigma_i^2} - B \cdot \sum_i \frac{y_i}{\sigma_i^2}}{Den},$$

$$A = \sum_i \frac{1}{\sigma_i^2}, B = \sum_i \frac{x_i}{\sigma_i^2}, Den \text{ is } Den = \sum_i \frac{x_i^2}{\sigma_i^2} \cdot \sum_i \frac{1}{\sigma_i^2} - \left(\sum_i \frac{x_i}{\sigma_i^2}\right)^2,$$

and c is $c = \dfrac{\sum_i \frac{(y_i - m \cdot x_i)}{\sigma_i^2}}{\sum_i \frac{1}{\sigma_i^2}}.$ 20. An apparatus according to claim 16, wherein the presence of a bridge tap is determined if the value of the cost function is greater than a certain threshold.

21. An apparatus according to claim 20, wherein the threshold value is a small percentage of the average SNR over all frequencies of interest.

22. An apparatus according to claim 16, wherein the test signal is a periodic (from frame to frame) wide-bandwidth spectrally flat test signal.

23. An apparatus according to claim 16, wherein the cost function calculator calculates the cost function for a subset of all estimated signal power data points if the estimated signal power has an extremely high estimated noise variance over the remaining frequency region.

24. A modem with a built-in apparatus for performing transmission line diagnostics, comprising:
   a line interface circuit, coupled to a test signal generator and a processing unit and an apparatus for performing transmission line diagnostics, adapted to adjusting signal voltage levels to proper levels for transmission and processing;
   the test signal generator, having an output coupled to the transmission line, adapted to injecting test signals onto the transmission line;
   the processing unit, coupled to the transmission line and the apparatus for performing transmission line diagnostics, adapted to controlling the modem and processing data;
   the apparatus for performing transmission line diagnostics, coupled to the processing unit and the transmission line, adapted to providing an equivalent line length and detecting bridge taps, further comprising:
      a signal input, coupled to the transmission line, adapted to providing signals received from the transmission line;
      an estimation circuit, having an input coupled to the signal input and having a first output coupled to an equivalent line length calculator and a second output coupled to a cost function calculator, adapted to estimating metrics about the transmission line;

the equivalent line length calculator, having an input coupled to the estimation circuit and an output coupled to a data output, adapted to calculating an equivalent line length from the metrics;

the cost function calculator, having an input coupled to the estimation circuit and an output coupled to a bridge tap detector, adapted to calculating a cost function from the metrics;

the bridge tap detector, having an input coupled to the cost function calculator and an output coupled to the data output, adapted to determining the presence of a bridge tap if the cost function exceeds a threshold; and the data output, coupled to the equivalent line length calculator and the bridge tap detector and the processing unit, adapted to providing the calculated equivalent line length and the presence of bridge tap.

25. A system according to claim 24, wherein the metrics are comprised of estimated signal power and estimated noise power.

26. A system according to claim 24, wherein the apparatus for performing transmission line diagnostics is a software program executing in the processing unit.

27. A system according to claim 24, wherein the apparatus for performing transmission line diagnostics executes during the system's training period.

28. A system according to claim 24, wherein the apparatus for performing transmission line diagnostics uses the metrics calculated by the system.

29. A system according to claim 24, wherein the apparatus for performing transmission line diagnostics does not calculate the equivalent line length and determine presence of bridge taps until the processing unit is idle.

* * * * *